(12) United States Patent
May (10) Patent No.: US 10,011,105 B2
(45) Date of Patent: Jul. 3, 2018

(54) REMOVABLE SCRAPER DEVICE

(71) Applicant: C M 2000 LLC, Lancaster, KY (US)

(72) Inventor: Wesley May, Lancaster, KY (US)

(73) Assignee: C M 2000 LLC, Lancaster, KY (US)

(\*) Notice: Subject to any disclaimer, the term of this patent is extended or adjusted under 35 U.S.C. 154(b) by 0 days.

(21) Appl. No.: 15/490,402

(22) Filed: Apr. 18, 2017

(65) Prior Publication Data
US 2017/0297319 A1 Oct. 19, 2017

Related U.S. Application Data

(60) Provisional application No. 62/324,635, filed on Apr. 19, 2016.

(51) Int. Cl.
| | | |
|---|---|---|
| *B32B 43/00* | (2006.01) | |
| *E02F 3/34* | (2006.01) | |
| *E02F 3/40* | (2006.01) | |
| *E04G 23/00* | (2006.01) | |
| *E02F 3/96* | (2006.01) | |

(52) U.S. Cl.
CPC .......... *B32B 43/006* (2013.01); *E02F 3/3414* (2013.01); *E02F 3/401* (2013.01); *E02F 3/962* (2013.01); *E04G 23/006* (2013.01); *B32B 2471/00* (2013.01); *Y10S 156/929* (2013.01); *Y10S 156/94* (2013.01); *Y10T 156/1184* (2015.01); *Y10T 156/1967* (2015.01)

(58) Field of Classification Search
CPC ...... E04G 23/006; E02F 3/962; B32B 43/006; B32B 38/10; Y10S 156/929; Y10S 156/94; Y10T 156/1179; Y10T 156/1184; Y10T 156/1967; Y10T 156/1983
See application file for complete search history.

(56) References Cited

U.S. PATENT DOCUMENTS

| | | | |
|---|---|---|---|
| 2,864,184 A | 12/1958 | Fohr | |
| 3,891,035 A * | 6/1975 | Miller | A01B 49/02 172/197 |
| 4,009,529 A * | 3/1977 | Johnson | E02F 3/815 172/719 |

(Continued)

FOREIGN PATENT DOCUMENTS

WO WO 2014/024160 A1 2/2014

OTHER PUBLICATIONS

International Search Report and Written Opinion dated Jun. 30, 2017 for Application No. PCT/US2017/028083, 14 pgs.

*Primary Examiner* — Mark A Osele
(74) *Attorney, Agent, or Firm* — Frost Brown Todd (57) ABSTRACT

A removable scraper device is described herein. The removable scraper device includes an attachment element and a socket defined by the attachment element, wherein the socket is configured to receive a post of a scraper element therein. The removable scraper device further includes a slot defined by the attachment element, wherein the slot is configured to receive a portion of a bucket of a wheeled-machine therein. The removable scraper device further includes an aperture defined by the attachment element and a bolt sized to be received within the aperture. In some embodiments of the removable scraper device, the bolt and aperture are configured to selectively press the attachment element against the bucket to removably secure the removable scraper device thereto.

20 Claims, 8 Drawing Sheets

(56) References Cited

U.S. PATENT DOCUMENTS

| | | | |
|---|---|---|---|
| 4,043,060 A | 8/1977 | Stepe | |
| 4,189,854 A * | 2/1980 | Haynes | E02F 3/401 |
| | | | 37/404 |
| 4,597,205 A * | 7/1986 | Guest | E01H 5/06 |
| | | | 172/273 |
| 4,819,349 A * | 4/1989 | Mensch | E02F 3/404 |
| | | | 172/684.5 |
| 5,377,766 A * | 1/1995 | Klinger | E01C 19/15 |
| | | | 172/382 |
| 5,641,206 A | 6/1997 | Craft | |
| 5,918,389 A * | 7/1999 | Hall | E02F 3/8152 |
| | | | 37/407 |
| 6,092,876 A * | 7/2000 | Arbucci | E02F 3/815 |
| | | | 15/93.1 |
| 6,135,566 A | 10/2000 | Anderson | |
| 6,343,981 B1 * | 2/2002 | Buchanan | E04G 23/006 |
| | | | 156/763 |
| 6,813,834 B2 | 11/2004 | Anderson | |
| 6,957,869 B1 | 10/2005 | Sawtelle | |
| 7,082,686 B2 | 8/2006 | Anderson | |
| 7,562,412 B1 | 7/2009 | Anderson | |
| 2017/0037597 A1 * | 2/2017 | McLoughlin | E02F 3/962 |

\* cited by examiner

REMOVABLE SCRAPER DEVICE

BACKGROUND

In some instances, it may be desirable to scrape or clean flooring with the help of a machine during demolition of an existing building. Currently, the only option for floor scraping machinery consists of ride-on scraper machines dedicated solely to scraping flooring. These ride-on floor scraping machines perform no other function and require a large amount of money as well as storage space for this dedicated floor scraping machine.

Inasmuch as prior art machines are dedicated specifically to scraping flooring, the demolition supervisor must store and transport this limited purpose machine in addition to the additional equipment and machines additionally needed for a demolition project. One such general purpose wheeled-machine useful for demolition projects is known in the field as a "skid steer." Skid steers or a similar product are sold by many vendors and are typically already found at demolition job sites.

It may be desirable to provide a removable scraper device capable of connecting to a wheeled-vehicle such as a skid steer to provide floor scraping functionality to a readily available demolition machine and eliminate the need for a separate machine dedicated solely to floor scraping.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Removable Scraper Device

Figure 1:
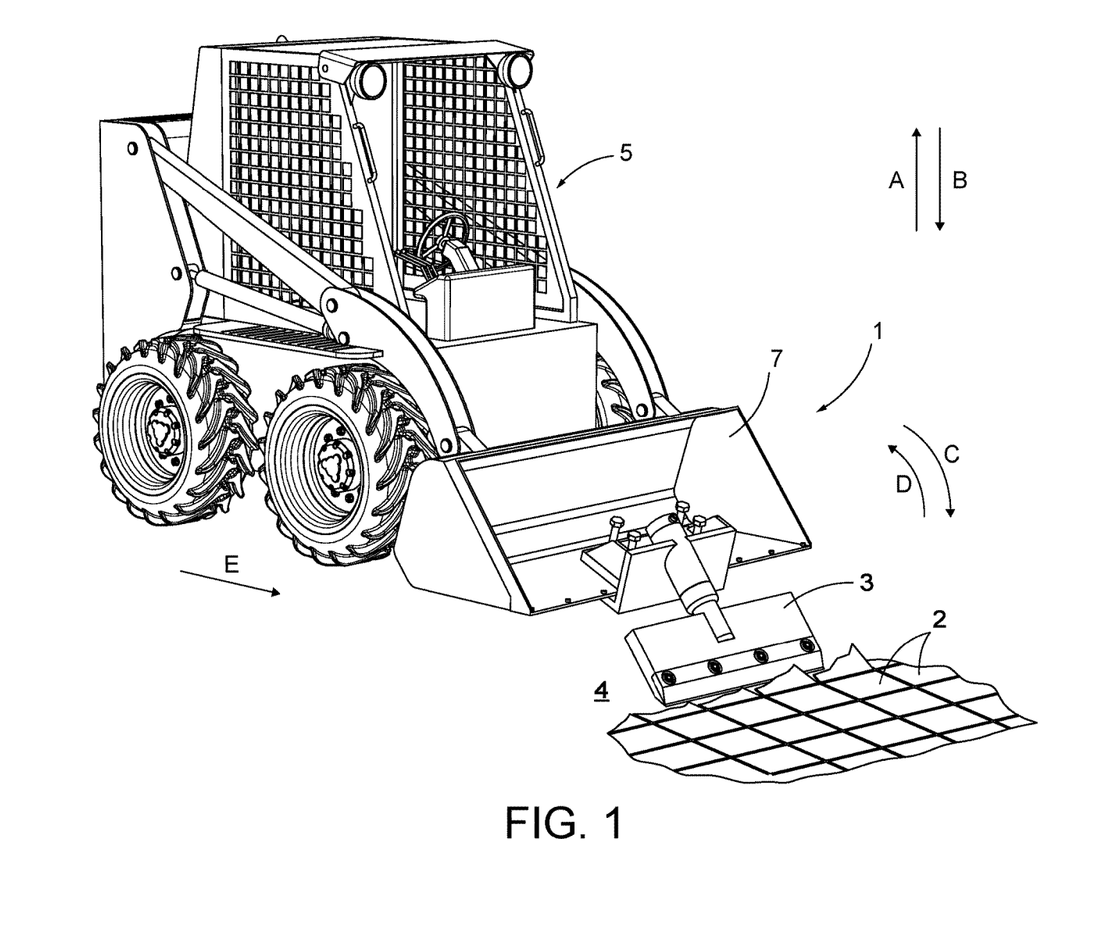
FIG. 1 depicts a perspective view of an exemplary removable scraper device removably secured to an exemplary wheeled-machine.
Figure 2:
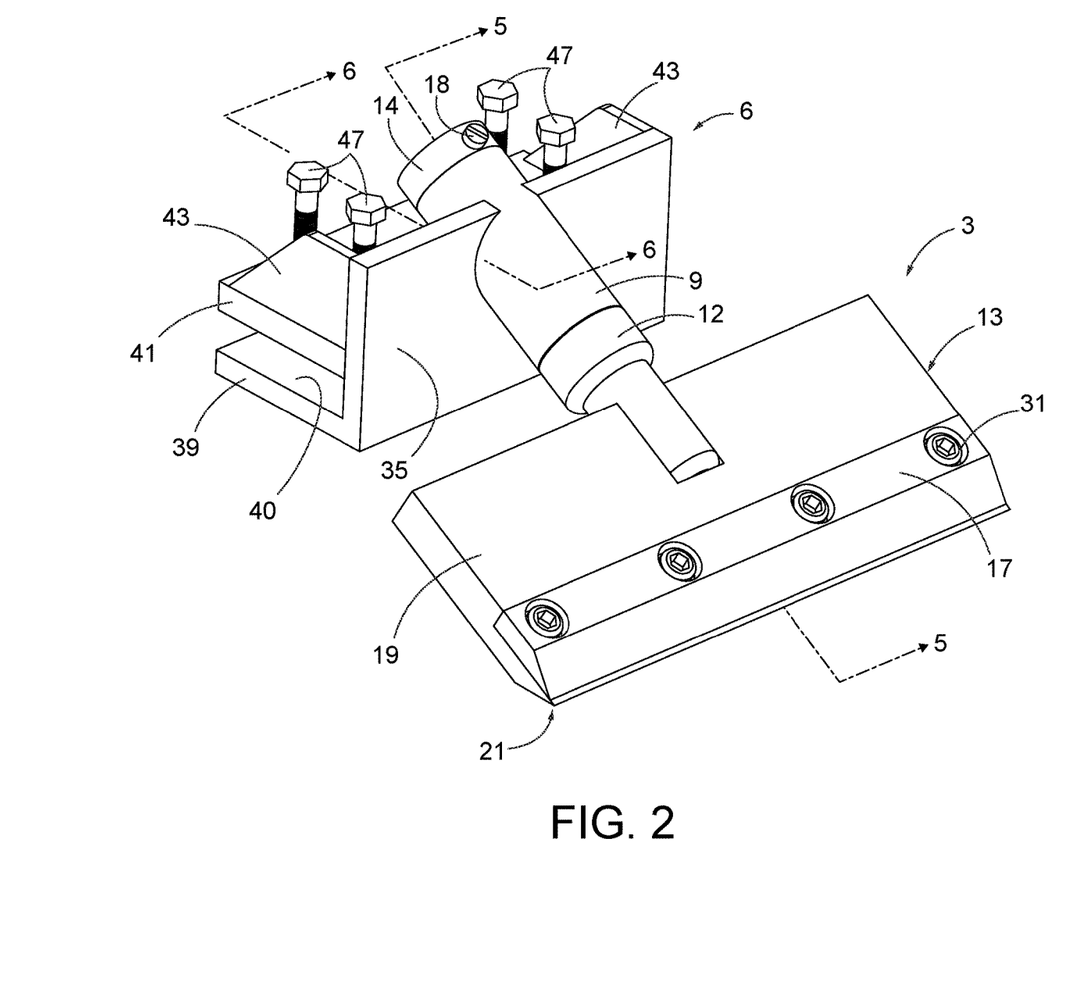
FIG. 2 depicts a top front perspective view of the removable scraper device of FIG. 1.
Figure 3:
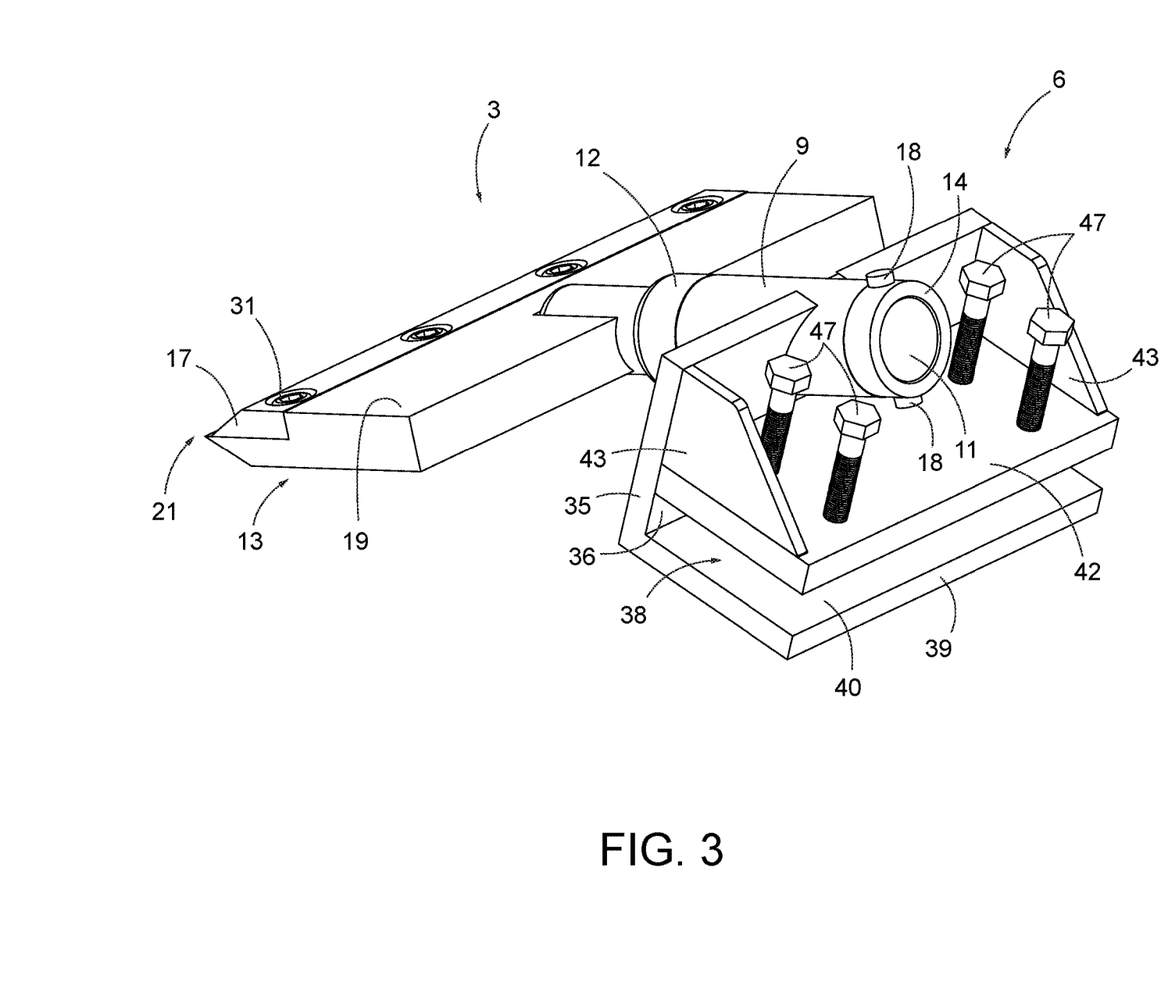
FIG. 3 depicts a top rear perspective view of the removable scraper device of FIG. 1.

As shown in FIG. 1, an exemplary removable scraper device (1) is illustrated attached to a bucket (7) of a wheeled-machine (5). Wheeled-machine (5) is operable to selectively move bucket (7) vertically in the direction of Arrow A and the opposite direction of Arrow B. Wheeled-machine (5) is also operable to selectively pivot bucket (7) about an axis in the direction of Arrow C and Arrow D. Wheeled-machine (5) is also operable to drive removable scraper device (1) horizontally in the direction of Arrow E into contact with a flooring layer (2). Flooring layer (2) is adhered or otherwise secured to a sub-flooring layer (4). In some environments, flooring layer (2) may be comprised of a plurality of tiles and sub-flooring layer (4) may be comprised of concrete, as shown in FIG. 1. In other environments, flooring layer (2) may be comprised of carpeting or wood or any other common flooring materials. Flooring layer (2) is removed and separated from sub-flooring layer (4) when portions of removable scraper device (1) is driven between flooring layer (2) and sub-flooring layer (4) by wheeled-machine (5).

As shown in FIGS. 1-7, removable scraper device (1) generally includes a scraping element (3) received in a socket (9) of an attachment element (6). Scraping element (3) is oriented within socket (9) of removable scraper device (1) to abut sub-flooring layer (4) to scrap or otherwise remove flooring layer (2) from sub-flooring layer (4). Scraping element (3) generally includes a post (11) extending from a blade portion (13). Post (11) is an elongated tubular member secured to blade portion (13) at a distal end and defining a pair of fastener receiver holes (15) at the proximal end. Post (11) may include a collar (12) for firm abutment with socket (9) when scraping element (3) is disposed in socket (9). Socket (9) defines a channel (10). Channel (10) is sized to receive post (11) and allow the proximal end of post (11) to extend entirely through channel (10) and out the far end.

Figure 4:
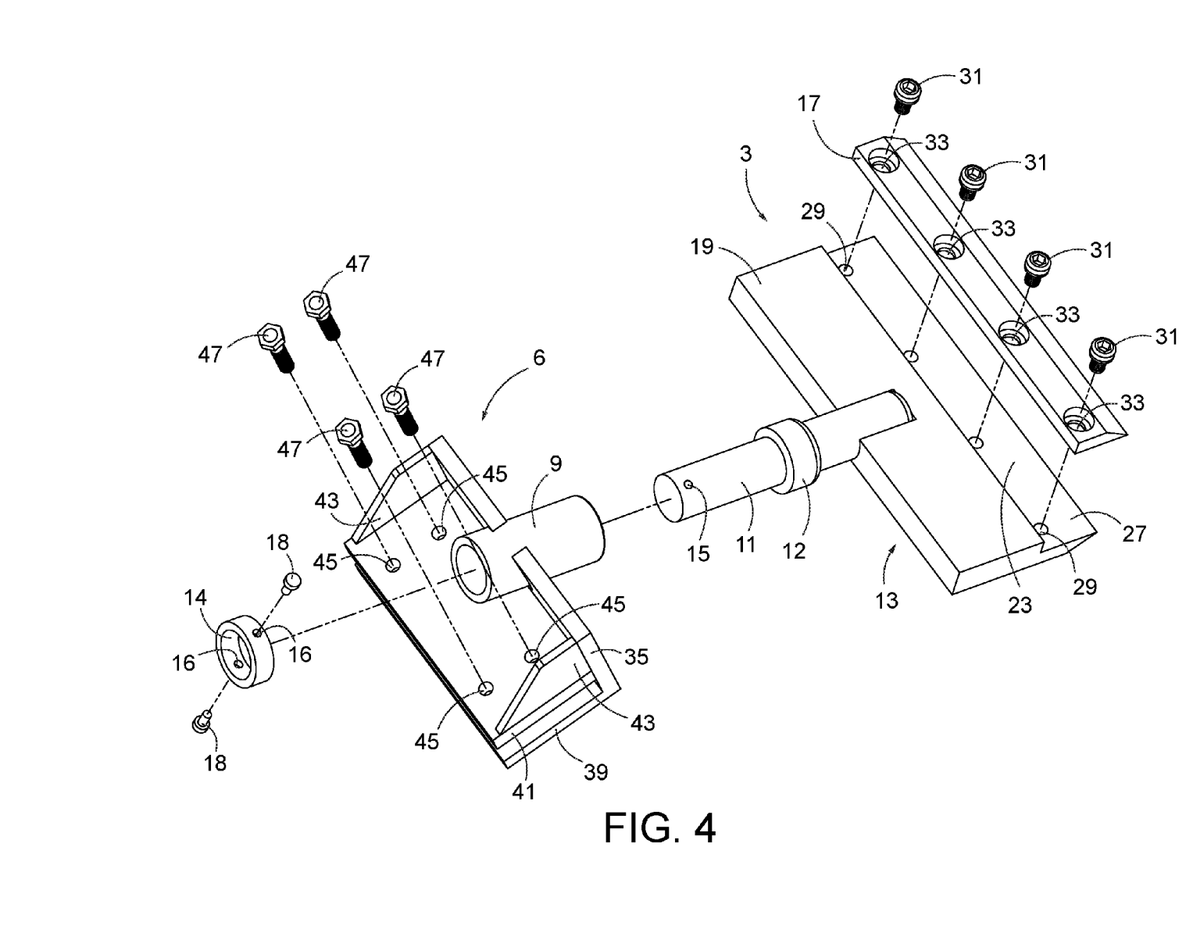
FIG. 4 depicts an exploded perspective view of the removable scraper device of FIG. 1.

A locking collar (14) is provided with a pair of holes (16) defined therein. Locking collar (14) is configured to slide onto the proximal end of post (11) and align holes (16) of locking collar (14) with holes (15) of post (11) and allow a corresponding pair of fasteners (18) to extend therethrough and secure locking collar (14) onto post (11). Once locking collar (14) is secured to post (11), scraping element (3) is rotatably secured in channel (10) of socket (9).

Blade portion (3) includes an upper blade (17) secured to a lower blade (19) to form a scape edge (21). Lower blade (19) defines a ledge (23) by way of a back wall (25) and a bottom wall (27). Ledge (23) is sized to receive upper blade (17) thereon and to brace upper blade (17) through an abutment with back wall (25) and bottom wall (27). A plurality of threaded holes (29) are defined by lower blade (19) extending through bottom wall (27). Threaded holes (29) are sized and positioned to receive threaded fasteners (31). Threaded fasteners (31) pass through corresponding holes (33) defined by upper blade (17) to secure upper blade (17) to lower blade (19).

Figure 5:
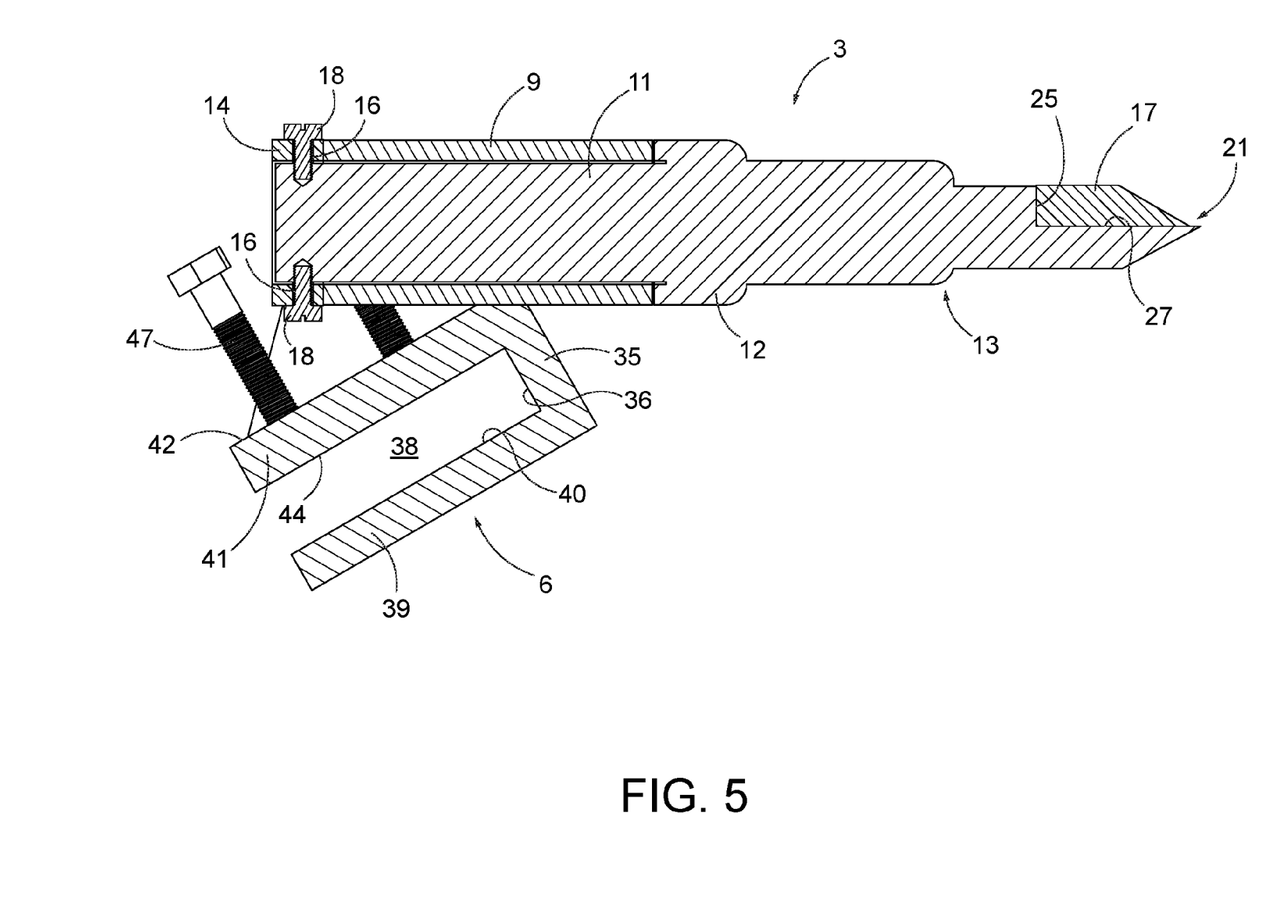
FIG. 5 depicts a cross-sectional view taken along line 5-5 of FIG. 2.

Attachment element (6) includes a front wall (35) defining a socket opening (37) and having a surface (36). Socket opening (37) is sized to allow socket (9) to extend therethrough. In some versions of attachment element (6), socket (9) and front wall (35) are welded around the periphery of socket opening (37) to secure socket (9) within front wall (35). A lower wall (39) having a surface (40) is provided at an angle to front wall (35) and connected thereto by way of a weld or another securement mechanism. Alternatively, front wall (35) and lower wall (39) may be formed of a singular sheet of material and bent or otherwise formed to provide front wall (35) at an angle to lower wall (39). As shown in FIG. 5, the angle between front wall (35) and lower wall (39) may be an approximately ninety-degree angle.

Attachment element (6) further includes an upper wall (41) extending from front wall (35) at an angle and having an upper surface (42) and a lower surface (44). In some versions of attachment element (6), upper wall (41) is connected to front wall (35) by way of a weld or another securement mechanism. Alternative, front wall (35) and upper wall (41) may be formed of a singular sheet of material and bent or otherwise formed to provide front wall (35) at an angle to upper wall (41). As shown in FIG. 5, the angle between front wall (35) and upper wall (41) may be an approximately ninety-degree angle.

As shown in FIG. 4, a pair of side walls (43) may be disposed between upper wall (41) and front wall (35). In some versions of attachment element (6), side walls (43) are connected to upper wall (41) and front wall (35) by way of a weld or another securement mechanism. Side walls (43) provide a bracing between front wall (35) and upper wall (41) and in some versions provide the connection between front wall (35) and upper wall (41).

Figure 6:
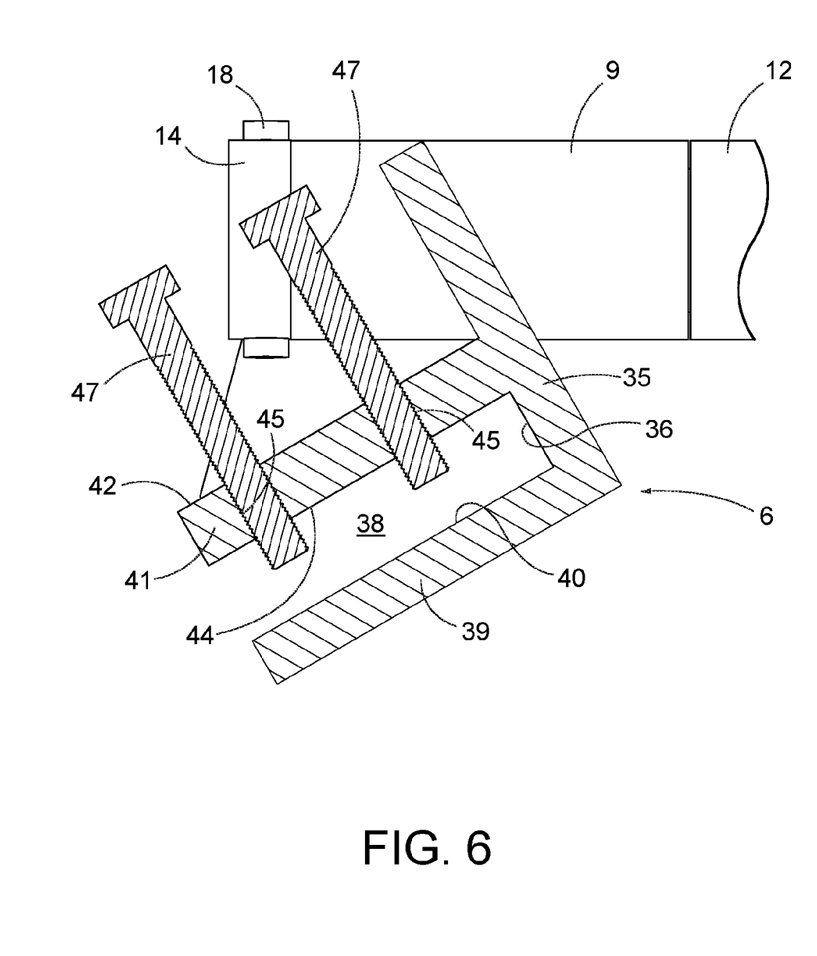
FIG. 6 depicts a cross-sectional view taken along line 6-6 of FIG. 2.

Front wall (35), lower wall (39), and upper wall (41) define a slot (38). Slot (38) is sized and oriented to receive bucket (7) therein. As shown in FIGS. 4-6, upper wall (41) of attachment element (6) defines a set of threaded apertures (45). Threaded apertures (45) extend from upper surface (42), through upper wall (41), out lower surface (44) and into slot (38). A corresponding set of threaded bolts (47) are provided and sized and configured to be received within and through threaded apertures (45). Threaded bolts (47) selectively extend into slot (38) to removably secure attachment element (6) to bucket (7) as desired. To secure attachment element (6) to bucket (7), the user rotates each bolt in a first direction to drive the threads of threaded bolts (47) against the threads of threaded apertures (45) and rotate threaded bolts (47) into slot (38) to firmly pin bucket (7) between threaded bolts (47) and surface (40) of lower wall (39).

Figure 7:
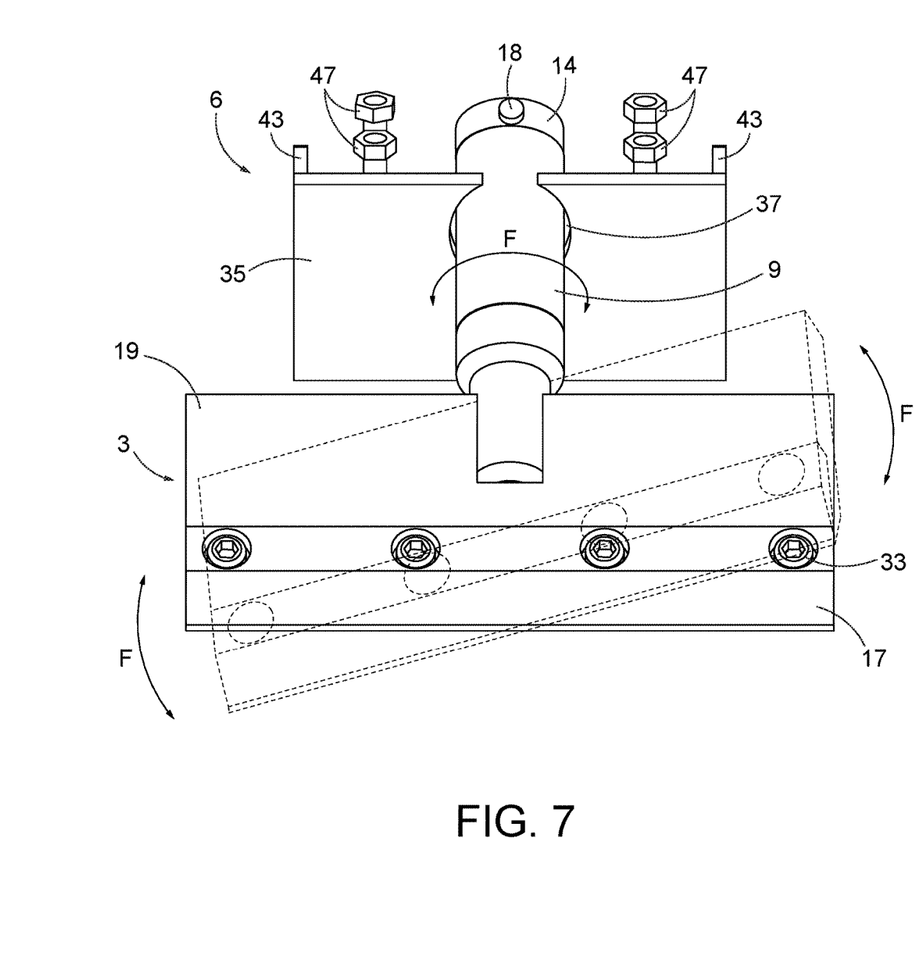
FIG. 7 depicts a front perspective view of the removable scraper device of FIG. 1.

As shown in FIG. 7, while threaded bolts (47) firmly pin bucket (7) to lower wall (39), post (11) is free to rotate within socket (9) without separating from attachment element (6) due to locking collar (14). Thus, scraping element (3) is free to rotate in the directions of Arrows F relative attachment element (6). Inasmuch as sub-flooring layer (4) may be somewhat bowed or non-planer, removable scraping device (1) is free to rotate in the directions of Arrows F to better conform to the shape of sub-flooring layer (4) as removable scraper device (1) is pressed thereupon.

As shown in FIG. 5, post (11) includes an imaginary longitudinal line (49). Similarly, slot (38) is parallel to an imaginary plane (51). Imaginary longitudinal line (49) extends at an angle (53) with respect to imaginary plane (51). In some versions of removable scraper device (1), angle (53) is between 30 degrees and 60 degrees.

II. Method of Using Removable Scraper Device

Figure 8:
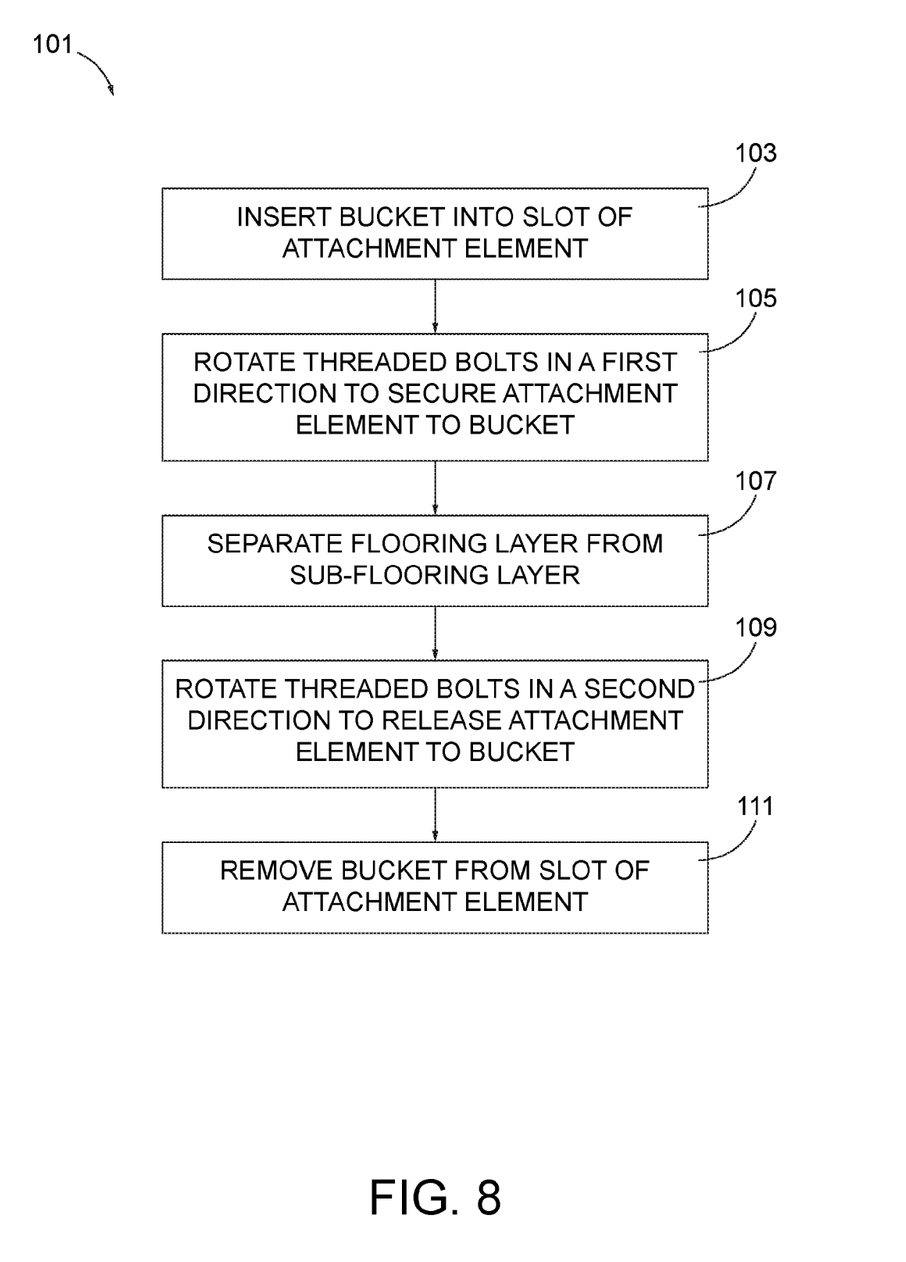
FIG. 8 depicts a flowchart of a method of using the removable scraper device of FIG. 1.

A method of using removable scraper device (1) is shown and described in FIG. 8 as a method (101). Method (101) begins with a step (103). In step (103), a user physically manipulates removable scraper device (1) such that a portion of bucket (7) of wheeled-machine (5) is inserted into slot (38) of attachment element (6) of removable scraper device (1). In some versions of step (103), the user physically picks up removable scraper device (1) and slides attachment element (6) onto bucket (7). Thereafter, step (103) proceeds to a step (105).

In step (105), the user rotates threaded bolts (47) in a first direction to drive each bolt (47) down into slot (38) and thereby firmly secure attachment element (6) of removable scraper device (1) to bucket (7) by pressing bucket (7) into lower wall (39). The front lip of bucket (7) is preferably pressed against surface (36) of front wall (35) to provide stability and additional abutment between bucket (7) and removable scraper device (1). Thereafter, step (105) proceeds to a step (107).

In step (107), the user manipulates wheeled-machine (5) to lower bucket (7) in the direction of Arrow B (FIG. 1) to ensure scrape edge (21) of blade (19) is positioned to separate flooring layer (2) from sub-flooring layer (4) as blade (19) is pressed therebetween. Thereafter, the user manipulates wheeled-machine (5) in the direction of Arrow E (FIG. 1) to press scrape edge (21) of blade (19) into sub-flooring layer (4) and separate flooring layer (2) from sub-flooring layer (4) as desired and as shown in FIG. 1. Step (107) thereafter proceeds to a step (109).

In step (109), the user rotates threaded bolts (47) in a second direction to retract each bolt (47) from slot (38). Once bolts (47) are retracted, bucket (7) is free to separate from attachment element (6). Thereafter, step (109) proceeds to a step (111). In step (111), bucket (7) is released from attachment element (6) of removable scraper device (1). In some versions of method (101), the user physically removes removable scraper device (1) from the attachment to wheeled-machine (5). The user may then store removable scraper device (1) at the jobsite for future needs or transport removable scraper device (1) to another job site.

As illustrated in FIGS. 1-7, any vehicle similar to wheeled-machine (5) having a bucket similar to bucket (7) may be used to removably receive removable scraper device (1) thereon, including a Bobcat® or a "skid-steer" type of machine.

III. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A removable scraper device configured to be removably attached to a pivotable bucket of a wheeled-machine, the device comprising:
    (a) an attachment element;
    (b) a scraping element connected to the attachment element, wherein the scraping element extends from a proximal end to a distal end, the scraping element comprising:
        (i) a post disposed at the proximal end;
        (ii) a lower blade extending from the post; and
        (iii) an upper blade disposed on the lower blade;
    (c) a slot defined by the attachment element, wherein the slot is sized to removably receive a pivotable bucket of a wheeled-machine therein; and
    (d) at least one fastener selectively movable to secure the bucket within the slot.

2. The device of claim 1, wherein the attachment element comprises a socket, wherein the scraping element comprises a post, wherein the socket is configured to receive the post therein.

3. The device of claim 2, wherein the slot is parallel to an imaginary plane, wherein the socket includes an imaginary longitudinal axis, wherein the axis is oriented at an angle with respect to the plane, wherein the angle is within the range of 30 degrees to 60 degrees.

4. The device of claim 1, wherein the fastener comprises a bolt, wherein the bolt is selectively extendable into the slot.

5. The device of claim 4, further comprising a threaded aperture defined by the attachment element, wherein the threaded aperture extends to the slot, wherein the threaded aperture is sized to rotatably receive the bolt therein.

6. The device of claim 5, wherein the bolt includes a plurality of threads disposed thereon.

7. The device of claim 1, wherein the attachment element comprises a top wall, a spaced apart bottom wall, and a front wall extending therebetween.

8. The device of claim 7, wherein the slot is defined by the top wall, bottom wall, and front wall.

9. The device of claim 8, wherein the top wall defines a hole sized to receive the fastener therein.

10. The device of claim 7, wherein the attachment element comprises a socket, wherein the socket extends through the front wall, wherein the scraping element comprises a post sized to be received in the socket.

11. The device of claim 1, wherein the upper blade and the lower blade meet at a scrape edge at the distal end, wherein the scrape edge is the outermost distal portion of the scraping element.

12. The device of claim 11, further comprising a locking collar, wherein the locking collar is disposed at a proximal end of the post.

13. A method of separating a flooring layer from a sub-flooring layer, the method comprising:
    (a) placing an attachment element of a removable scraper device onto a bucket of a wheeled-machine;
    (b) securing the attachment element to the bucket;
    (c) actuating the bucket to orient the removable scraper device toward a flooring layer disposed on a sub-flooring layer;
    (d) securing an upper blade onto a lower blade of a scraping element of the removable scraper device;
    (e) driving the wheeled-machine in a direction to press the scraping element between the flooring layer and the sub-flooring layer; and
    (f) separating the flooring layer from the sub-flooring layer.

14. The method of claim 13, further comprising securing the bucket within a slot defined by the attachment element.

15. The method of claim 14, further comprising:
    (a) rotating a threaded bolt disposed in a top wall of the attachment element; and
    (b) in response to rotating the threaded bolt, moving the threaded bolt into an abutment with the bucket disposed within the slot, wherein the bucket is prevented from separating from the attachment element by way of the abutment with the threaded bolt.

16. The method of claim 14, further comprising:
    (a) extending the slot parallel to an imaginary plane; and
    (b) connecting a post of the scraping element with a socket of the attachment element to orient an imaginary longitudinal axis of the post at an angle with respect to the imaginary plane, wherein the angle is between 30 degrees and 60 degrees.

17. The method of claim 13, further comprising:
    (a) disposing a post of the scraping element within a socket of the attachment element; and
    (b) securing a locking collar onto a proximal end of the post to retain the post within the socket.

18. A removable scraper device configured to be removably attached to a pivotable bucket of a wheeled-machine, the device comprising:
    (a) an attachment element, the attachment element comprising:
        (i) a top wall defining a hole;
        (ii) a bottom wall;
        (iii) a front wall extending from the top wall to the bottom wall;

(iv) a slot defined by the top wall, bottom wall, and front wall, wherein the slot is sized to receive the bucket therein; and
(v) a socket extending through the front wall; and
(vi) a bolt disposed in the hole, wherein the bolt is movable within the slot to secure the attachment element to the bucket; and
(b) a scraping element connected to the attachment element, the scraping element comprising:
(i) a post sized to be received in the socket of the attachment element;
(ii) a lower blade extending from the post;
(iii) a ledge defined by the lower blade;
(iv) an upper blade secured within the ledge; and
(v) a scrape edge defined by the lower blade and the upper blade, wherein the scrape edge is the outermost portion of the scraping element.

19. The removable scraper device of claim 18, wherein the upper blade is removably secured to the lower blade.

20. The removable scraper device of claim 18, wherein the upper blade defines a threaded hole therein.

\* \* \* \* \*